July 16, 1935.  A. WITTE  2,008,378
ROLLER BEARING
Filed Feb. 10, 1934
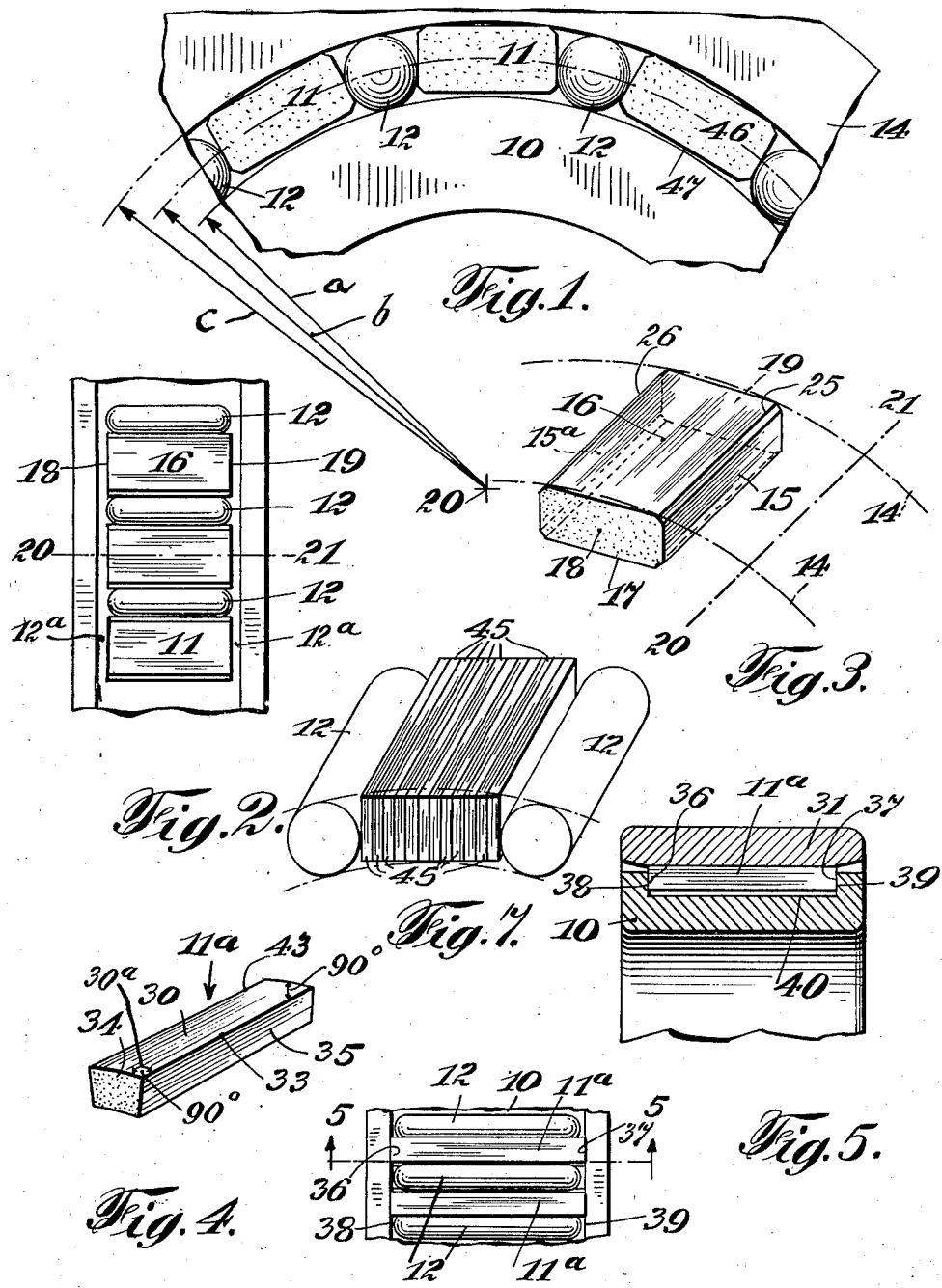
INVENTOR
Alfred Witte
BY C. P. Goepel
his ATTORNEY Patented July 16, 1935

2,008,378

UNITED STATES PATENT OFFICE 2,008,378

ROLLER BEARING

Alfred Witte, Leipzig, Germany, assignor, by mesne assignments, to Norma-Hoffmann Bearings Corporation, Stamford, Conn., a corporation of New York Application February 10, 1934, Serial No. 710,641
In Germany May 23, 1933

7 Claims. (Cl. 308—209)

This invention relates in general to roller bearings and more particularly to a novel bearing of this class which may best be characterized in a general way as a spacer bearing roller.

Generally considered, rollers for roller bearings, have a length equal to or slightly larger than their diameter. Under the broad classification of roller bearings, a form of bearing has hitherto been developed known as a needle bearing, the length of which is usually about three times its diameter. A well-known characteristic feature of performance of a needle bearing is that the needles interposed between the inner and outer rings, slide or revolve as an entity structure and in non-rotating sliding relation to the raised surfaces of said rings, the only needles individually rotating being those directly subjected to load. In the invention herein described, the rollers, though possessed of needle characteristics, that is, their length being three times or more their diameter, do not slide in their entirety, but possess roller characteristics, in that they rotate in the same manner as ordinary rollers. In view of the small diameter of these rollers, the use of ordinary cages cannot be availed of, but in place thereof it is necessary to provide means which will enable the rollers to maintain their proper positions parallel with each other and with their axes parallel with the axis of rotation of the bearing. Unless so maintained, the rollers will assume askew positions and, acting like screw-threads, will jam in and also jam the bearing. Devices embodying the present invention prevent any jamming interaction, under minimum assembly clearances.

The roller devices of the bearing may preferably have a diameter of two to five millimeters and a length of about five to ten times the diameter, and to distinguish these devices from the rollers of roller bearings, and from the needles of needle bearings, they will be referred to as spacer bearing rollers as a term definitive of the roller devices of the sizes indicated when used with individually free spacers or loose spacing bodies therebetween. In this arrangement, the spacer bearing rollers serve as means for operatively keeping the spacers or spacing bodies apart so that the individual rollers throughout the circle of the bearing will have free and independent rotative action in accordance with the usual roller bearing mode of operation irrespective of any entity movement of the rollers and spacers in the race-way rings. The spacers or spacing bodies serve as guides for the rollers; they are of cross-sectionally angular form and are free and unconnected for individual adjustment, extending in their longitudinal direction parallel with the axis of the roller bearing whereby a floating stabilization of the spacers is maintained. In consequence, the rollers are maintained in their most efficient operative positions, and jamming interaction is prevented.

Various embodiments of the invention will be hereinafter shown and described, and finally the invention will be particularly pointed out in the subjoined claims.

In the drawing:—

Figure 1 is a partial side view of a bearing showing spacers and spacer bearing rollers arranged in accordance with my invention between inner and outer race rings, the spacers being shown in a position corresponding to their position when under centrifugal action;

Figure 2 is a plan view showing the spacers and spacer bearing rollers of the bearing;

Figure 3 is a perspective view of a spacer shown as cooperating with a phantom outer race of the outer race ring;

Figure 4 is a perspective view of another form of spacer;

Figure 5 is a cross section of inner and outer race rings, showing a spacer therebetween;

Figure 6 is a partial plan view, showing spacer bearing rollers alternating with spacers of the embodiment shown in Figures 4 and 5; and Figure 7 is a perspective view of a spacer composed of separate sheets of material, and showing the bearing rollers longitudinally thereof.

Similar characters of reference designate similar parts throughout the several views.

Referring to the drawing, and more particularly to Figure 1, the inner race ring 10 has placed thereon, in alternately disposed arrangement, a plurality of spacer bearing rollers 12, and spacers 11 which extend around the periphery of the inner race ring. In place of the inner race ring 10, a shaft may be employed. Surrounding this aggroupment of spacers and rollers, an outer race ring 14 is provided. The distance between the exterior race-way surface of the inner race ring and the interior race-way surface of the outer race ring, is substantially the diameter of the spacer rollers 12, suitable allowance being of course made for the usual clearances including the lubricating oil film, but the depth of the spacers 11 is slightly less than the diameter of the rollers 12. In Figure 1 a space will be seen between the inner race and the spacer. Circumferentially of the bearing and with due allowance for the lubricating oil film, the rollers and spacers contact with each other as shown in Figures 1 and 2. In Figure 1, the radius $a$ radiates from the axis 20 and is the radius of curvature of the inner race ring, and similarly the radius $c$ is the outer race ring radius of curvature, and radius $b$ is the radius of the pitch diameter.

The spacers 11, are made of a material of a high wear-resisting and good running quality, or of a molded or pressed fibrous resinous material, or from a product known as "Formika". Bronze may also be used. The spacers 11, are preferably made from bakelite with fibrous inclusions, or from material commercially known as "Micarta". These spacers are cut or produced in a manner that the fibers run longitudinally thereof, whereby the pressure applied to the opposite sides of the spacers by the rollers acting thereon is best taken up without subjecting the material of which the spacers are composed to a destructive action, rendering them easily breakable. The spacers 11 comprise elongated bodies substantially rectangular in cross-section, and in the assembled bearing their opposite elongated sides 15, 15ª contact the adjacent rollers 12, with their upper sides 16 facing the outer race surface, and their lower sides 17 facing the inner race surface. The two end sides 18 and 19 of the spacers face outwardly in planes at right angles to the axis of rotation 20—21 of the bearing unit. Upper edges 25 and 26 are formed therein and these make linear contact with the cylindrical surface of the outer race ring 14. Said edges 25 and 26 are parallel with each other, and in the operation of the bearing maintain a parallelism with the axis of rotation 20—21, by virtue of their linear contact with the outer race ring. This gives the spacers so stable a position that the rollers which have a tendency to incline from their desired parallel positions, are prevented from doing so, and in turn are prevented from displacing the spacers from the parallel positions just referred to. At the same time, as the spacers remain parallel, the rollers are kept in parallel position thereby.

The three radii shown as radiating from the axis 20, are respectively the radius $a$ of the inner race, the radius $c$ of the outer race, and the intermediate radius corresponding to the pitch diameter radius. From the embodiment shown in Fig. 2, it will be noted that relatively wide clearances or spaces 12ª may exist between the terminals or ends of the rollers 12 and spacers 11 and the adjacent walls of the inner or outer race rings, as the case may be, though the drawing shows, for the sake of clearness, these lateral spaces somewhat enlarged.

Another embodiment is shown in Figures 4 and 5. In this form, the outer surface 30 of the spacer 11ª, is represented as curved transversely to conform in general with the contour of the curvature of the outer race ring 31, and the inner surface of this spacer 11ª, is also transversely curved to conform generally with the outer curved surface of the inner race ring. The long edge 33 and the short edge 34, form an angle of 90° with each other. Rollers are placed adjacent the side 35 and the side opposite thereto. The side 36 and the side 37 opposite thereto, contact with the sides 38 and 39 of the inner race ring. In this instance, the inner race ring may be cut or preferably channeled to provide the sides 38 and 39 for the spacer 11ª, and the groove 40 is provided in the inner race ring 10 for guiding the rollers 12 and the spacers 11ª. The upper transversely curved surface 30 of the spacers provide for one or two linear contacts in their longitudinal direction with the outer race ring, and these contact lines are parallel with the axis of rotation of the bearing, and thereby this action, together with the lateral retaining or guiding action of the sides 38 and 39, holds the spacers in position parallel with the axis of rotation, with the result that the rollers are maintained in positions parallel therewith. If manufacturing conditions would permit the provision of concentricity between the outer surface 30 of the spacers and the inner surface of the outer race ring, then it could be said that all parts of the two surfaces contact, but as the manufacturing conditions to such end are costly and involve other drawbacks, it is expedient to accomplish the same results through the one or two line contacts referred to as existing between the respective surfaces. If there is a two-line contact, then the edge 33 and its opposite edge 43, may well be the linear contacts.

The action of the rollers at either side of the spacers, serve to create forces acting on the spacers, the resultant of which act on the spacers and hold them in position and serve to press the spacers against the outer race in linear contact. The mass of the spacers under the action of centrifugal and other forces serves to cause the spacers to right themselves, so that their linear contacts are maintained paralled with the axis of rotation of the bearing.

The pitch diameter line passes through the axes of the rollers, and also through the spacers but radially inwards of the axes of the spacers. The opposite sides of the spacers are provided with flat surfaces which contact with the rollers on tangential longitudinal lines of the sides of the spacers radially inwards of the pitch diameter line. The sides of the spacers in the direction of the axis of rotation of the bearing does not contact with the inner race ring but allows for a space between the spacer and inner race ring. The sides of the spacers facing the outer race ring make linear contact therewith, on lines parallel with the axis of rotation of the bearing. If, as shown in Figure 1, the configuration of the spacer there shown is used, then the corners of the spacers are cut off to provide beveled corners, whereby the lineal contact with the outer race ring is brought slightly inwardly of the two opposing sides with which the spacer contacts with the outer race ring. To illustrate the relative propositions, the inner race ring radius is 25, the pitch diameter line radius is 28, and the outer race ring radius is 31, the depth of the spacer is 2.85, the length 19.6, the width 2.85, the length of the roller 19.8, the radius of the roller 3; and the number of spacers 17; and the cut off corners about 0.3 mm.

In the commercial manufacture of spacers and spacer rollers, and bearing rings, in which even the highest precision is not mathematically true, it is sometime found that the last remaining space, after all the other rollers and spacers have been assembled in the race rings, is larger or smaller than the size of the spacer which is to be applied. Usually the space remaining is larger than the width of the last spacer. To compensate for this, certain of the spacers may be made somewhat wider to take up this extra large space, as shown for instance, by the spacer 46, which is wider than the spacers 11, but otherwise the same, allowing also for a space 47 between the spacer 46 and the inner race ring, or smaller spacers may be used. A compensation spacer to take up variations of spacing due to change of pitch and grinding of rings, may thus be provided to advantage.

The spacers may be made of separate sheets of suitable material. These laminations 45 are so placed that the longitudinal run of the fibers of the material are parallel with the longitudinal axis of the adjacent bearing rollers, as shown in Fig. 7.

The spacers are made of a material which is quite unbreakable, and which have good antifriction characteristics, whereby a gliding action results. The rollers move around circumferentially in the usual manner of roller bearings and the spacers therebetween move with the rollers or are moved thereby, and thus it is advantageous to have the spacers made of a material which does not provide frictional resistance.

From the foregoing, it will be evident that there has been provided in place of the usual retaining cage, an efficient arrangement in which the spacers, instead of being connected by the rings of a cage, merely float between the race rings and the spacer bearing rollers, and are held in such controlled position that the spacers control the position of the spacer bearing rollers which have a tendency to get out of parallelism in respect to the axis of rotation of the bearing, and are prevented from doing so by the spacers.

My invention has been illustrated and described with some degree of particularity, but it is understood that changes may be made in the form of details and in the construction and arrangement of parts without departing from the spirit or scope of the invention or the scope of the appended claims.

I claim:—

1. In a roller bearing which includes an inner and outer raceway and needle-like rollers therebetween, elongated unconnected spacing bodies between the rollers and contacting therewith adapted to maintain the latter for individual rotation with their axes in regular parallel relation to the axis of the bearing, the depth of the bodies being less than the diameter of the rollers, bearing means on said bodies for stabilizing the bodies and rollers adapted to contact and engage the surface of the outer raceway under centrifugal action of the rollers and bodies, the said bodies being free from contact with the inner raceway, said bearing means being formed on the outer opposite edges of the bodies and extending in the longitudinal direction thereof parallel with the axes of the rollers, and in close proximity to the rollers, to cooperate with the outer raceway surface along lineal lines approximate to the lines of contact of the rollers and outer raceway and lying in stabilizing relation to the projected outlines of the rollers whereby to resist askew displacement from the regular parallel relation with the bearing axis.

2. In a roller bearing which includes a raceway and needle-like rollers, free and unconnected spacer devices adapted substantially to fill the spaces between the rollers, said spacer devices having means on the outer opposite edges thereof, adapted to contact and engage the raceway surface under centrifugal action of the rollers and spacers for stabilizing the same, said means extending in the longitudinal direction thereof in parallel relation to the axis of the bearing.

3. In a roller bearing which includes a raceway and needle-like rollers, free and unconnected spacer devices adapted to fill the spaces between the rollers, certain of said spacers being larger or smaller than the majority of the spacers between the rollers to compensate for any unequal space remaining after almost all of the rollers and spacers have been inserted in the raceway, said spacers having means adapted to contact and engage the raceway surface under centrifugal action of the rollers and spacers for stabilizing the same, said means extending in the longitudinal direction thereof in parallel relation to the axis of the bearing.

4. In a roller bearing which includes a raceway and needle-like rollers, free and unconnected spacing bodies alternating with the rollers, and having oppositely disposed flat sides and generally parallel with the axes thereof, said rollers and spacers having substantially the same length, the depth of the spacers being less than the diameters of the rollers, and the longitudinal axes of the spacers being radially outwardly of the pitch diameter line passing through the axes of the rollers, whereby the rollers contact with the opposite flat sides of the spacers below the pitch diameter line on longitudinal lines of the spacers tangential to the rollers.

5. In a roller bearing which includes a raceway and needle-like rollers, free and unconnected spacing bodies alternating with the rollers, and having oppositely disposed flat sides and generally parallel with the axes thereof, said rollers and spacers having substantially the same length, the depth of the spacers being less than the diameters of the rollers, and the longitudinal axes of the spacers being radially outwardly of the pitch diameter line passing through the axes of the rollers, whereby the rollers contact with the opposite flat sides of the spacers below the pitch diameter line on longitudinal lines of the spacers tangential to the rollers, all of the rollers and spacers contacting with each other throughout the circumferentially disposed space between the inner and outer rings, when the bearing has been assembled, and said spacers having linear contact with the outer race ring on lines parallel with the axis of rotation of the bearing.

6. A spacer roller bearing, comprising inner and outer race rings forming a space therebetween, rollers disposed in said space, and spacers interposed between the rollers, said spacers being formed of laminations, the sheets thereof having their longitudinal fibers parallel with the longitudinal axis of the rollers.

7. In a roller bearing which includes an inner and an outer raceway and needle-like rollers therebetween, the diameters of the rollers being substantially equal to the depth of the space between the raceways, elongated unconnected spring bodies between the rollers and contacting therewith of a length substantially equal to the length of the rollers, of a depth less than the diameters of the rollers and of a width equal to the distance between the rollers, the outer opposite edges of the bodies being parallel with the axes of the rollers and in proximity thereto, and having linear contact with the outer race ring, the inner surface of the bodies being free from contact with the race rings, whereby said spacer bodies resist any askew displacement from the regular parallel relation of the rollers with the bearing axis.

ALFRED WITTE.